United States Patent
Kim et al.

(10) Patent No.: US 11,107,197 B2
(45) Date of Patent: Aug. 31, 2021

(54) APPARATUS FOR PROCESSING IMAGE BLURRING AND METHOD THEREOF

(71) Applicant: HYUNDAI MOBIS Co., Ltd., Seoul (KR)

(72) Inventors: Won Ho Kim, Yongin-si (KR); Gu Hwan Bae, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 62 days.

(21) Appl. No.: 16/539,813

(22) Filed: Aug. 13, 2019

(65) Prior Publication Data
US 2020/0058107 A1   Feb. 20, 2020

(30) Foreign Application Priority Data
Aug. 14, 2018   (KR) .................. 10-2018-0095065

(51) Int. Cl.
*G06T 5/00*   (2006.01)
*G06T 5/20*   (2006.01)

(52) U.S. Cl.
CPC .............. *G06T 5/003* (2013.01); *G06T 5/002* (2013.01); *G06T 5/20* (2013.01)

(58) Field of Classification Search
CPC ............ G06T 5/003; G06T 5/20; G06T 5/002
See application file for complete search history.

(56) References Cited

U.S. PATENT DOCUMENTS

| | | | |
|---|---|---|---|
| 7,787,015 B2 | 8/2010 | Stavely | |
| 2003/0086608 A1* | 5/2003 | Frost | G01N 21/6428 382/173 |
| 2007/0188617 A1 | 8/2007 | Stavely | |
| 2016/0155216 A1* | 6/2016 | Yoon | G06T 5/002 382/264 |

\* cited by examiner

*Primary Examiner* — Matthew C Bella
*Assistant Examiner* — Kaleb Tessema
(74) *Attorney, Agent, or Firm* — NovoTechIP International PLLC

(57) ABSTRACT

Provided is an apparatus for processing image blurring configured to extract a sample image by calculating a blur generation area through scales of a horizontal length and a vertical length of an original image, read a pixel value corresponding to the blur generation area calculated from the original image and perform a bitwise operation on the sample image, and set, at a pixel of the sample image changed by the bitwise operation, a result value of the bitwise operation. In this case, the bitwise operation performed on the sample image includes applying the same blurring value on n pixel regions adjacent to a corresponding pixel of the sample image to reduce the time for removing image noise.

12 Claims, 2 Drawing Sheets

| BEFORE IMPROVEMENT | AFTER IMPROVEMENT |
|---|---|
| 260 | 87 |
| 248 | 82 |
| 300 | 83 |
| 277 | 92 |
| 244 | 92 |
| 246 | 79 |
| 283 | 83 |
| 269 | 98 |
| 262 | 88 |
| 246 | 85 |

| AVERAGE | |
|---|---|
| BEFORE IMPROVEMENT | AFTER IMPROVEMENT |
| 263.5 | 86.9 |

APPARATUS FOR PROCESSING IMAGE BLURRING AND METHOD THEREOF

CROSS-REFERENCE TO RELATED APPLICATION

This application claims priority to and the benefit of Korean Patent Application No. 10-2018-0095065, filed on Aug. 14, 2018, the disclosure of which is incorporated herein by reference in its entirety.

BACKGROUND

1. Field of the Invention

The present invention relates to image blurring, and more specifically, to an apparatus for processing image blurring capable of reducing the time for removing noise of an image on the basis of an image blurring algorithm, and a method thereof.

2. Discussion of Related Art

Image blurring is a technology that provides a visual effect of reducing detail by manipulating pixel values of an image, also referred to as smoothing, and widely used in software for correcting an image and in graphics for providing a visual effect on a displayed image on a display.

In addition to visual effects, image blurring may perform a function of filtering to remove noise in an original image.

Images photographed by a camera include white noise or salt and pepper noise, and since the noise may interfere with a user's recognition through image processing, image blurring is performed as pre-processing to remove the noise. Recently, image blurring has been also used in the fields such as autonomous vehicles and robotics.

An algorithm for image blurring is implemented through a numerical approach that represents a digital image as a matrix of two-dimensional data and a filter as a mask.

However, the conventional image blurring algorithm performs a convolution sum of an image matrix and a filter mask as shown in Equation 1 for each pixel of a digital image.

$$H(x, y) = I * M = \sum_{j=0}^{height} \sum_{i=0}^{width} I(i, j) M(x - i, y - j) \quad \text{[Equation 1]}$$

($I$ = image matrix, $M$ = mask matrix)

When the original image has a large resolution, the amount of data computation and the memory usage are increased, so there is a need to configure high-performance hardware, which increases the cost for configuring hardware. In view of the increasing sizes of displays of today, the conventional image blurring algorithm is very inefficient.

In addition, the image blurring algorithm, when applied to graphics, may reduce the reactivity of a graphic user interface (GUI), and when applied to image processing, may cause an output frame to be dropped.

SUMMARY OF THE INVENTION

The present invention is directed to providing an apparatus for processing image blurring capable of reducing the time for removing image noise in an original image by applying the same blurring value to n regions adjacent to each pixel of a sample image extracted from the original image, and a method thereof.

The technical objectives of the present invention are not limited to the above, and other objectives may become apparent to those of ordinary skill in the art based on the following descriptions.

According to an aspect of the present invention, there is provided an apparatus for processing image blurring, the apparatus including: a camera configured to capture an image; a memory in which a program for performing blurring processing on the image is stored; and a processor configured to execute the program stored in the memory, wherein the processor, in response to the program being executed, calculates a blur generation area from an original image captured by the camera to extract a sample image, reads a pixel value in the blur generation area to perform a bitwise operation, and applies a result of the bitwise operation to a pixel of the sample image to generate a blur image.

The processor may apply the same blurring value on n pixel regions adjacent to each pixel in the sample image.

The processor may adjust a scale of at least one of a horizontal length and a vertical length of the original image to calculate the blur generation area.

The processor may extract a region corresponding to 1/L of the horizontal length and 1/L of the vertical length of the original image to adjust a total size of the original image to $1/L^2$.

According to another aspect of the present invention, there is provided a method of processing image blurring performed by an apparatus for processing image blurring, the method including: calculating a blur generation area of an original image captured by a camera from the original image to extract a sample image; copying the extracted sample image; reading a pixel value in the blur generation area to perform a bitwise operation; and applying a result of the bitwise operation to a pixel of the sample image to generate a blur image.

The performing of the bitwise operation may include applying the same blurring value to n pixel regions adjacent to each pixel in the sample image to perform the bitwise operation.

The extracting of the sample image may include adjusting a scale of at least one of a horizontal length and a vertical length of the original image to calculate the blur generation area.

The extracting of the sample image may include extracting a region corresponding to 1/L of the horizontal length and 1/L of the vertical length for the original image to adjust a total size of the original image to $1/L^2$.

DETAILED DESCRIPTION OF EXEMPLARY EMBODIMENTS

Figure 1:
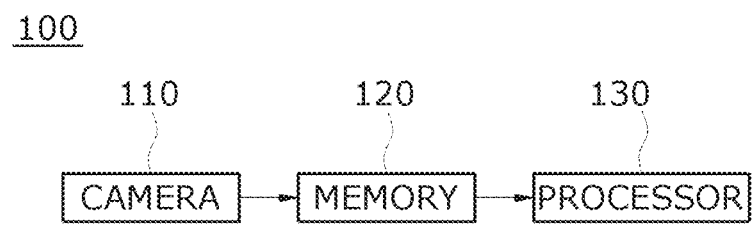
FIG. 1 is a block diagram illustrating an apparatus for processing image blurring according to an embodiment of the present invention.

Hereinafter, embodiments of the present invention will be described in detail with reference to the accompanying drawings so that those skilled in the art may easily carry out the present invention. The present invention may be embodied in various forms and is not to be construed as limited to the embodiments set forth herein. In the drawings, parts irrelevant to the description have been omitted for the clarity of explanation.

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

The present invention relates to an apparatus 100 for processing blurring and a method thereof.

In order to solve the above described problems, the present invention extracts a sample image to correspond to a size of a blurring target image, and performs a bitwise operation in which the same blurring value is applied to n regions adjacent to each pixel, so that the time for removing noise of the image is reduced.

Hereinafter, the apparatus 100 for processing image blurring according to the embodiment of the present invention will be described with reference to FIG. 1.

FIG. 1 is a block diagram illustrating the apparatus 100 for processing image blurring according to the embodiment of the present invention.

Referring to FIG. 1, the apparatus 100 for processing image blurring includes a camera 110, a memory 120, and a processor 130.

The camera 110 captures an original image on which image blurring is to be performed.

The memory 120 stores a program for performing a blurring process on the original image captured by the camera 110.

Meanwhile, the memory 120 of the apparatus 100 for processing image blurring according to the embodiment of the present invention may be a generic name for a nonvolatile storage device that retains stored information even when power is not supplied and a volatile storage device.

For example, the memory 120 may include a NAND flash memory such as a compact flash (CF) card, a secure digital (SD) card, a memory stick, a solid state drive (SSD), and a micro SD card, a magnetic computer memory device such as a hard disk drive (HDD), and an optical disc drive such as a compact disc read only memory (CD-ROM) and a digital versatile disc (DVD)-ROM.

The processor 130, in response to the program stored in the memory 120 and being executed, performs an image blurring algorithm on the original image captured by the camera 110.

In detail, the image blurring algorithm performed by the processor 130, first, calculates a blur generation area from the original image, extracts a sample image by mapping the calculated blur generation area to the original image, reads a pixel value within the blur generation area to perform a bitwise operation, and then, applies a result of the bitwise operation to pixels of the sample image to generate a blur image.

Here, the bitwise operation includes applying the same blurring value to pixels of n regions adjacent to each pixel of the sample image. The blurring value used for the bitwise operation is derived as the sample image is extracted.

According to the embodiment of the present invention, the n regions may be eight regions, and pixels surrounding each pixel are assigned the same blurring value.

For reference, the elements of the apparatus 100 for processing image blurring according to the embodiment of the present invention may each be implemented in the form of software or in the form of hardware such as a field programmable gate array (FPGA) or an application specific integrated circuit (ASIC) and may perform predetermined functions.

However, the 'elements' are not meant to be limited to software or hardware. In other embodiments, each of the elements may be stored in an addressable storage medium, or may execute one or more processors.

Therefore, for example, the elements may include elements such as software elements, object-oriented software elements, class elements, and task elements, processes, functions, attributes, procedures, subroutines, segments of program code, drivers, firmware, microcode, circuits, data, databases, data structures, tables, arrays, and variables.

Elements and functions provided in corresponding elements may be combined into fewer elements or may be further divided into additional elements.

Hereinafter, a method of processing image blurring performed by the apparatus 100 for processing image blurring according to the embodiment of the present invention will be described in detail with reference to FIG. 2.

Figure 2:
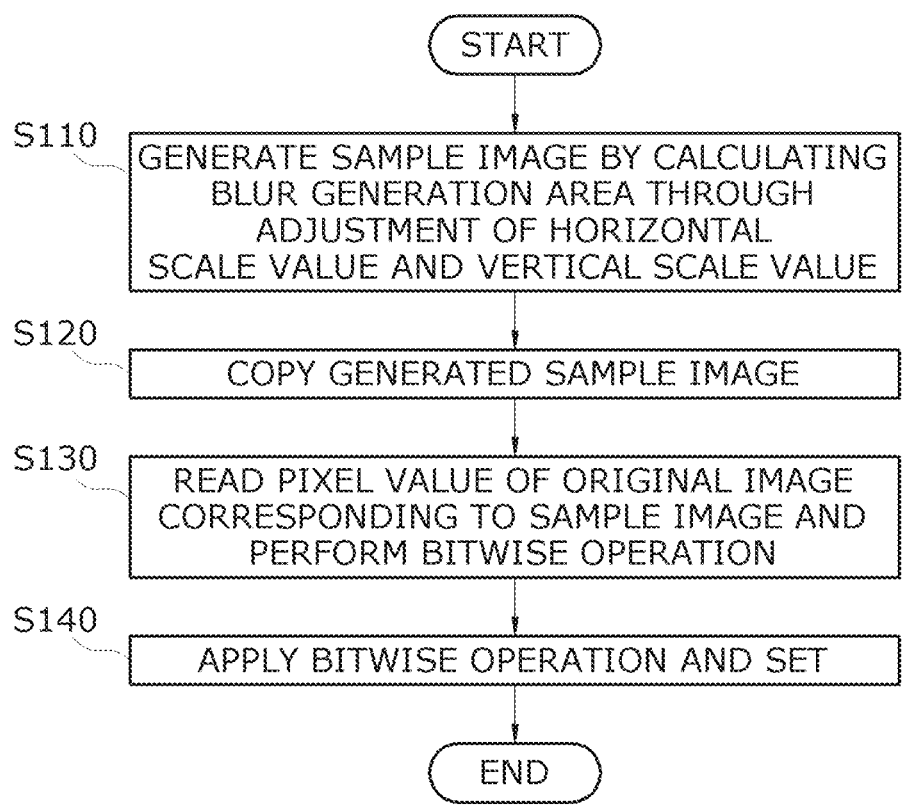
FIG. 2 is a flowchart showing a method of processing image blurring according to an embodiment of the present invention.

FIG. 2 is a flowchart showing the method of processing image blurring according to the embodiment of the present invention.

Referring to FIG. 2, the method of processing image blurring first includes extracting a sample image by calculating a blur generation area through adjustment of a horizontal scale value and a vertical scale value of an original image, and mapping the calculated blur generation area to the original image (S110).

In this case, according to the embodiment of the present invention, the operation S110 of extracting the sample image may be performed by the following program code.

final long startCreationBitmapTime=SystemClock.uptimeMillis( );
int width=Math.round(sentBitmap.getWidth ( )>>SCALE_FACTOR);
int height=Math.round(sentBitmap.getHeight ( )>>SCALE_FACTOR);
sentBitmap=Bitmap.createScaledBitmap(sentBitmap, width, height, false);
final long startCreationBitmapTime=SystemClcok.uptimeMillis);

The blur generation area calculated above is extracted by 1/L of a horizontal length and 1/L of a vertical length of the original image, and this is reduced to $1/L^2$ of the total size of the original image.

According to the embodiment of the present invention, the blur generation area is extracted by ¼ of the horizontal length and ¼ of the vertical length of the original image, and thus reduced to ¹⁄₁₆ of the original image.

Thereafter, in order to perform a bitwise operation, the extracted sample image is copied (S120).

According to the embodiment of the present invention, the operation S120 of copying the sample image may be performed by the following program code.

final long startCopiedBitmapTime=SystemClock.uptimeMillis( );
    Bitmap bitmap=sentBitmap.copy(sentBitmap.getConfig ( ), true);
    final long startCopiedBitmapTime=SystemClock.uptimeMillis( );

Thereafter, a pixel value of the original image that corresponds to the copied sample image is read and is subjected to a bitwise operation (S130).

Here, the bitwise operation allows the same blurring value to be applied to n regions adjacent to a corresponding pixel, so that the time for removing noise of an image is reduced.

According to the embodiment of the present invention, the n regions may be eight regions, so that pixels surrounding each pixel are assigned the same blurring value.

Here, the blurring value is derived as the sample image is extracted in operation S110 of extracting the sample image.

According to the embodiment of the present invention, the operation S130 of performing the bitwise operation may be performed by the following program code.

```
    final long startConversionBitmapTime = SystemClock.uptimeMillis( );
    int w = bitmap.getWidth( );                    stackpointer = (stackpointer +
1)%div;
    int h = bitmap.getHeight( );                   sir = stack[stackpointer]
    int[ ] pix = new int[w*h];                     routsum + = sir[0];
    //Log.e("pix", w+" "+h+" "+pix.length);         goutsum + = sir[1];
    bitmap.getPixels(pix, 0, w, 0, 0, w, h);       boutsum += sir[2];
    int wm = w − 1;                                rinsum− = sir[0]
    int hm = h − 1;                                ginsum− = sir[1]
    int wh = w*h;                                  binsum− = sir[2]
    int div = radius + radius +1;                  yi+=w;
        }
    }
        final long endConversionBitmap =
SystemClockMills( );
```

Finally, at the pixel changed by the application of the bitwise operation, a result value of the bitwise operation is set (S140).

According to the embodiment of the present invention, the operation S140 of setting the result value of the bitwise operation may be performed by the following program code.

final long startSetBitmapTime=SystemClock.uptimeMillis( );
    bitmap.setPixels(pix, 0, w, 0, 0, w, h);
    final long endSetBitmapTime=SystemClock.uptimeMillis( );

Operations S110 to S140 described above may be further divided into additional operations or may be combined into fewer operations according to embodiments. In addition, some operations may be omitted if required, and the order thereof may be switched. In addition, content described in FIG. 1 that is omitted in FIG. 2 may be applied to the method of processing image blurring described with reference to FIG. 2.

Hereinafter, improvement of blur generation time by the apparatus 100 for processing image blurring and the method thereof according to the embodiment of the present invention will be described with reference to FIGS. 3 and 4.

Figures 3, 4:
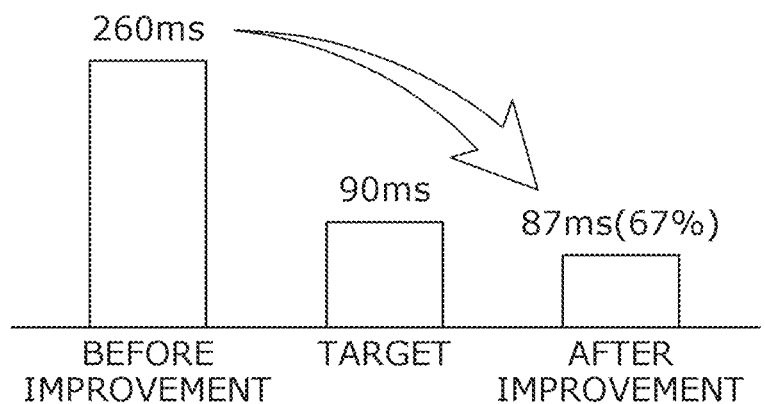
FIG. 3 is a table showing numerical values of improvement in blur generation time by an apparatus for processing image blurring according to an embodiment of the present invention.
FIG. 4 is a view for describing an improvement in blur generation time by an apparatus for processing image blurring according to an embodiment of the present invention.

FIG. 3 is a graph showing numerical values of improvement in blur generation time by the apparatus for processing image blurring according to the embodiment of the present invention, and FIG. 4 is a view for describing an improvement in blur generation time by the apparatus for processing image blurring according to the embodiment of the present invention.

FIG. 3 shows an example in which the blur generation time of the image blurring algorithm is simulated a plurality of number of times, showing ten of the plurality of simulation resultant values that are easy to be compared.

The values before the improvement each represent the time for removing image noise using the conventional algorithm without using the method of processing image blurring according to the present invention, in which the average time for generating a blur image is 263.5 ms. The values after the improvement each represent the time for removing image noise improved by applying the method of processing image blurring according to the present invention, in which the average time for generating a blur image is 86.9 ms.

Referring to FIG. 4, it can be seen that the time for removing image noise improved by applying the method of processing image blurring according to the present invention is reduced by 67% as compared to the value before the improvement, surpassing the target value of 90 ms.

Meanwhile, the apparatus 100 for processing image blurring according to the present invention and the method thereof may be used through the following scenarios.

Application Example 1

The apparatus 100 for processing image blurring according to the embodiment of the present invention and the method thereof may interwork with forward collision-avoidance assist (FCA) and autonomous emergency breaking (AEB).

That is, with respect to a moving object popping out of a blind spot, a blurring image generated by the apparatus 100 for processing image blurring and the method thereof is displayed on a front glass portion through interworking with the FCA based on lidar, so that the driver may rapidly recognize the moving object.

In this case, the apparatus 100 for processing image blurring according to the embodiment of the present invention and the method thereof may rapidly receive a large amount of data through Ethernet audio video bridging (AVB) and provide the original image on audio, video, navigation (AVN)/cluster screen.

Application Example 2

The apparatus 100 for processing image blurring according to the embodiment of the present invention and the method thereof may perform data communication with an infotainment system.

That is, when an impact is applied to a vehicle, current state information of the driver and current state information of the vehicle are synchronized using data communication with the infotainment system through a black box or a vehicle impact recognition sensor such that the current state information is informed to the outside.

In this case, the apparatus 100 for processing image blurring according to the embodiment of the present invention and the method thereof may capture a collision image through a black box and a surround view monitor (SVM) when the driver is located outside the vehicle, and transmit the original image to the driver and allow the original image to be shared at a place where the original image is required, such as an insurance company. In addition, when the driver is located inside the vehicle, a blur image generated according to the embodiment of the present invention may be displayed on the AVN or a head unit.

Application Example 3

The apparatus 100 for processing image blurring according to the embodiment of the present invention and the method thereof may display a blur image on a head unit.

When a pedestrian or a moving object is detected in an image of a rear view camera, the image is subject to blurring around the pedestrian, and is displayed as a blur image generated according to the embodiment of the present invention on the head unit.

In this case, the apparatus 100 for processing image blurring according to the embodiment of the present invention and the method thereof may display the original image on AVN/cluster screens.

The embodiment of the present invention may be implemented in the form of a computer program stored in a medium executed by a computer or a recording medium including instructions executable by a computer. Computer-readable media may be any available media that may be accessed by a computer, and include both volatile and nonvolatile media and both removable and non-removable media. The computer-readable medium may also include both computer storage media and communication media. The computer storage media includes volatile, nonvolatile, removable, and non-removable media implemented in any method or technology for storing information such as computer readable instructions, data structures, program modules or other data. The communication media typically includes computer readable instructions, data structures, program modules, or other data in a modulated data signal, such as a carrier wave, or another transport mechanism, and any information delivery media.

Although the method and system according to the present invention have been described in relation to the specific embodiments, some or all of those elements or operations may be implemented using a computer system having a general purpose hardware architecture.

The present invention may be carried out by computer readable code in a computer readable recording medium. The code may be designed as a render script such that a graphic processing unit (GPU) is used for operations for image blurring processing.

As is apparent from the above, when an image blurring algorithm is performed, even for a large image, a sample is extracted to correspond to a size of a blurring target image, and a bitwise operation applying the same blurring value is performed on regions adjacent to each pixel, so that the time for removing noise of the image can be reduced.

Accordingly, the speed at which a lane is recognized can be increased from the user's perspective, and the time for generating a user interface (UI) to focus attention of users for warning or caution is reduced, so that the user can be provided with appropriate visual effects.

The exemplary embodiments of the present invention are illustrative in nature, and those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. For example, each element described as a single entity may be implemented in a distributed form, and elements described as being distributed may be implemented in a combined form.

The scope of the invention it set forth in the following claims rather than the above specification, and it is intended that the present invention covers all modifications provided they come within the scope of the appended claims and their equivalents.

What is claimed is:

1. An apparatus for processing image blurring, the apparatus comprising:
   a camera configured to capture an image;
   a memory in which a program for performing blurring processing on the image is stored; and
   a processor configured to execute the program stored in the memory,
   wherein the program, when executed by the processor, causes the processor to:
      determine a first scale factor for scaling a width of an original image;
      determine a second scale factor for scaling a height of the original image;
      generate a scaled sample image using the original image, the first scale factor, and the second scale factor, wherein the scaled sample image is smaller than the original image by a factor of (1/(the first scale factor)*(the second scale factor));
      read, from the original image, a plurality of pixel values corresponding to the scaled sample image;
      perform a bitwise operation on the plurality of pixel values read from the original image;
      identify one or more changed pixels of the scaled sample image whose values were changed as a result of the bitwise operation; and
      for the one or more changed pixels, set one or more corresponding pixel values according to the result of the bitwise operation.

2. The apparatus of claim 1, wherein the processor applies a same blurring value to n pixel regions adjacent to each pixel in the scaled sample image to perform the bitwise operation.

3. The apparatus of claim 1, wherein the processor is further configured to adjust the first scale factor and the second scale factor based on a horizontal length and a vertical length of the original image.

4. The apparatus of claim 1, wherein the processor is further configured to extract a region corresponding to 1/L of the horizontal length of the original image and 1/L of the vertical length of the original image to generate the scaled sample image having a size equal to $1/L^2$ of a size of the original image.

5. A method of processing image blurring performed by an apparatus for processing image blurring, the method comprising:
- determining a first scale factor for scaling a width of an original image;
- determining a second scale factor for scaling a height of the original image;
- generating a scaled sample image using the original image, the first scale factor, and the second scale factor, wherein the scaled sample image is smaller than the original image by a factor of (1/(the first scale factor)*(the second scale factor));
- reading, from the original image, a plurality of pixel values corresponding to the scaled sample image;
- performing a bitwise operation on the plurality of pixel values read from the original image;
- identifying one or more changed pixels of the scaled sample image whose values were changed as a result of the bitwise operation; and
- for the one or more changed pixels, setting one or more corresponding pixel values according to the result of the bitwise operation.

6. The method of claim 5, wherein the performing of the bitwise operation includes applying a same blurring value on n pixel regions adjacent to each pixel in the scaled sample image to perform the bitwise operation.

7. The method of claim 5, further comprising adjusting the first scale factor and the second scale factor based on a horizontal length and a vertical length of the original image.

8. The method of claim 7, further comprising extracting a region corresponding to 1/L of the horizontal length of the original image and 1/L of the vertical length of the original image to generate the scaled sample image having a size equal to $1/L^2$ of a size of the original image.

9. The apparatus of claim 1, wherein the processor is located inside a vehicle, the processor further configured to detect a lane in which the vehicle is driving using at least the scaled sample image such that a latency associated with the detection of the lane is reduced due to the use of the scaled sample image.

10. The apparatus of claim 1, wherein the processor is located inside a vehicle, the processor further configured to generate a user interface using at least the scaled sample image such that a latency associated with the generation of the user interface is reduced due to the use of the scaled sample image.

11. The method of claim 5, further comprising detecting a lane in which a vehicle is driving using at least the scaled sample image such that a latency associated with the detection of the lane is reduced due to the use of the scaled sample image.

12. The method of claim 5, further comprising generating a user interface using at least the scaled sample image such that a latency associated with the generation of the user interface is reduced due to the use of the scaled sample image.

* * * * *